May 23, 1967

N. HAMILTON 3,321,588

AUTOMATIC CONTROL MEANS

Filed June 24, 1965

INVENTOR
NEVILLE HAMILTON.

BY

WATSON, COLE, GRINDLE *and* WATSON

ATTORNEYS

May 23, 1967 — N. HAMILTON — 3,321,588
AUTOMATIC CONTROL MEANS
Filed June 24, 1965 — 8 Sheets-Sheet 6

FIG. 10A.

| CAM POSITION | | OPERATION | IMPULSER | INTERVAL TERMINATION | | | | | | | | | | PROGRAMME | | | | | | |
|---|---|---|---|---|---|---|---|---|---|---|---|---|---|---|---|---|---|---|---|---|
| | | | | 171 15" | 172 1' | 173 4' | 174 8' | 175 30° | 176 40° | 177 65° | 178 95° | 179 LOW | 180 HIGH | 1 WHITES HEAVY SOILED | 2 WHITES LIGHT SOILED | 3 COLOUREDS HEAVY SOILED | 4 WOOLENS | 5 DRIP DRY | 6 SPIN DRY | 7 RETURN TO ZERO |
| PRE-WASH | 1 | FILL | HIGH | | | | | | | | | | | | | | | | | |
| | 2 | HEAT & TUMBLE | 30 C | | | | | | | | | | | | | | | | | |
| | 3 | PUMP (TUMBLE TO E) | 1' | | | | | | | | | | | | | | | | | |
| WASH | 4 | FILL | LOW | | | | | | | | | | | | | | | | | |
| | 5 | HEAT & TUMBLE | HIGH | | | | | | | | | | | | | | | | | |
| | 6 | " " " | 30°C | | | | | | | | | | | | | | | | | |
| | 7 | " " " | 40°C | | | | | | | | | | | | | | | | | |
| | 8 | " " " | 65°C | | | | | | | | | | | | | | | | | |
| | 9 | " " " | 95°C | | | | | | | | | | | | | | | | | |
| | 10 | TUMBLE | 1' | | | | | | | | | | | | | | | | | |
| | 11 | " | 4' | | | | | | | | | | | | | | | | | |
| | 12 | " | 8' | | | | | | | | | | | | | | | | | |
| | 13 | PUMP (TUMBLE TO E) | 1' | | | | | | | | | | | | | | | | | |
| | 14 | PUMP | 1' | | | | | | | | | | | | | | | | | |

INVENTOR
NEVILLE HAMILTON.
BY
WATSON, COLE, GRINDLE & WATSON
ATTORNEYS

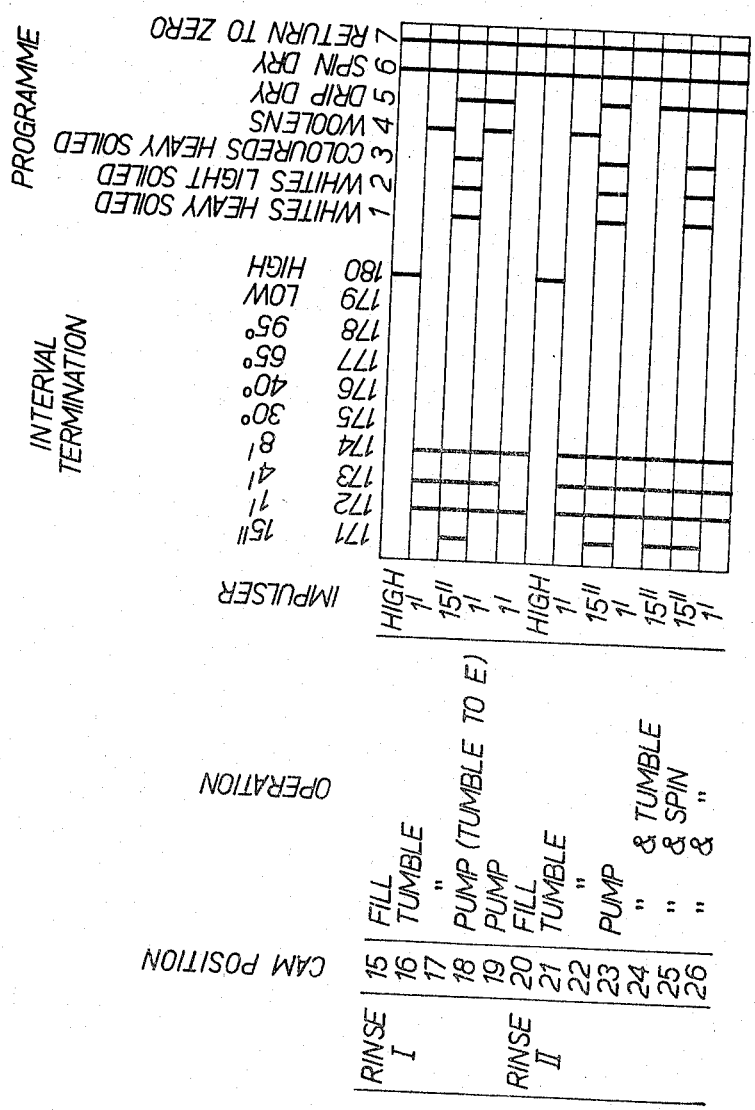

May 23, 1967    N. HAMILTON    3,321,588
AUTOMATIC CONTROL MEANS
Filed June 24, 1965    8 Sheets-Sheet 8

FIG. 10C.

| CAM POSITION | OPERATION | IMPULSER | INTERVAL TERMINATION | | | | | | | | | | | PROGRAMME | | | | | | |
|---|---|---|---|---|---|---|---|---|---|---|---|---|---|---|---|---|---|---|---|---|
| | | | 171 15" | 172 1' | 173 4' | 174 8' | 175 30° | 176 40° | 177 65° | 178 95° | 179 LOW | 180 HIGH | | 1 WHITES HEAVY SOILED | 2 WHITES LIGHT SOILED | 3 COLOURED HEAVY SOILED | 4 WOOLENS | 5 DRIP DRY | 6 SPIN DRY | 7 RETURN TO ZERO |
| 27 | FILL | HIGH | | | | | | | | | | | | | | | | | | |
| 28 | TUMBLE | 1' | | | | | | | | | | | | | | | | | | |
| 29 | " | 15" | | | | | | | | | | | | | | | | | | |
| 30 | PUMP & TUMBLE | 1' | | | | | | | | | | | | | | | | | | |
| 31 | " & SPIN | 15" | | | | | | | | | | | | | | | | | | |
| 32 | " & " | 15" | | | | | | | | | | | | | | | | | | |
| 33 | " & " | 1' | | | | | | | | | | | | | | | | | | |
| RINSE III 34 | FILL | HIGH | | | | | | | | | | | | | | | | | | |
| 35 | TUMBLE | 1' | | | | | | | | | | | | | | | | | | |
| 36 | " | 15" | | | | | | | | | | | | | | | | | | |
| 37 | PUMP & TUMBLE | 1' | | | | | | | | | | | | | | | | | | |
| 38 | " & SPIN | 15" | | | | | | | | | | | | | | | | | | |
| 39 | " & " | 15" | | | | | | | | | | | | | | | | | | |
| RINSE IV 40 | " & " | 15" | | | | | | | | | | | | | | | | | | |
| 41 | " & " | 15" | | | | | | | | | | | | | | | | | | |
| 42 | OFF | 4' | | | | | | | | | | | | | | | | | | |

INVENTOR
NEVILLE HAMILTON
BY
WATSON, COLE, GRINDLE & WATSON
ATTORNEYS

United States Patent Office 3,321,588
Patented May 23, 1967

3,321,588
AUTOMATIC CONTROL MEANS
Neville Hamilton, Chiswick, London, England, assignor to The Hoover Company, North Canton, Ohio, a corporation of Delaware
Filed June 24, 1965, Ser. No. 466,689
Claims priority, application Great Britain, June 26, 1964, 26,567/64
4 Claims. (Cl. 200—38)

This invention relates to automatic control means for a multi-program automatic machine such as a washing machine, of the type including a group of operating cams connected to move together to actuate electric operating contacts arranged to control various operations of the machine, stepping driving means for moving the operating cams forward a step when energized, interval terminating means for normally energizing the stepping driving means at the end of each of the operations, and preselecting means for preselecting sub-programs by immediately advancing the operating cams to by-pass unwanted operations.

In such an arrangement the operating cams are arranged to cover what may be termed a master program including all the operations that will be required in any of the sub-programs, some of which may be alternatives never employed together in a single program. The preselecting means then serve to energize the stepping driving means independently of the actuating means at those positions of the operating cams representing operations that are not required in the selected program.

The interval terminating means may comprise a timer arranged to energize the stepping driving means after a predetermined interval to control the time of an operation.

Alternatively in order to discontinue an operation the stepping driving means may be energized by another device, e.g., a level-responsive switch in the case of filling or emptying, or a thermostat in the case of heating.

It has been suggested to employ preselecting means comprising a contact brush carried by the cams and co-operating with a series of fixed segments corresponding with various positions of the cams and therefore various operations. The preselecting means serves to select segments which are connected in circuit with the stepping driving means and a source of supply so that when the cam reaches the position in question the contact brush will complete the circuit and the cam will immediately be driven on so as to by-pass that operation.

According to the present invention preselecting means include two or more program cams driven together with the operating cams, over-riding contacts common to all the programs for energizing the stepping driving means, and means arranged to be actuated selectively by any one of the program cams for actuating the over-riding contacts. Such means may include a cam follower mounted to be movable selectively so as to co-operate with any one of the program cams.

Conveniently the program cams are constituted by a number of concentric tracks on a face cam.

The arrangement may include a carrier having a primary cam follower engaging the selected program cam to move the carrier in a direction, which will be termed a primary direction, switch means actuated by such movement, and a secondary cam follower engaging a manually actuated selector cam to move the carrier in a direction, which will be termed a secondary direction, substantially perpendicular to the primary direction to shift the primary cam follower from one program cam to another.

Preferably the carrier is provided with manually actuated means for moving it in the primary direction to withdraw the primary cam follower from one program cam before shifting it in the secondary direction to register with another program cam.

Thus in one form of the invention the selector cam has cam surfaces in three dimensions so as to move the carrier both in the primary direction and in the secondary direction. For example it may comprise a disc having in it a stepped spiral slot consisting of concentric portions producing no movement of the carrier and oblique portions each moving the carrier one step in the primary direction, and ramps comprising level portions producing no movement of the carrier but holding the primary cam follower withdrawn from the program cams, and inclined portions for producing movement of the carrier in the secondary direction, the level portions of the ramps registering with the oblique portions of the cam slot whilst the inclined portions register with the concentric portions, and are arranged to cause the primary cam follower to advance towards the selected program cam in the middle of each concentric portion.

In an alternative form of the invention the selector cam is actuated by rotation of a knob which is also mounted so as to be capable of sliding axially and arranged so that axial movement of the knob effects withdrawal of the first cam follower from the program cams. Interlocking means may be provided to ensure axial movement of the knob before rotation from one pre-determined position to another. The program cams may also serve to actuate contacts, which will be termed blocking contacts, in series with one or more of the operating circuits, so as to ensure that components such as motors are not momentarily energized as the operating cam is passed rapidly through positions corresponding to portions to be omitted.

The invention may be performed in various ways but certain specific embodiments will be described by way of example with reference to the accompanying diagrammatic drawings, in which.

Figure 6:
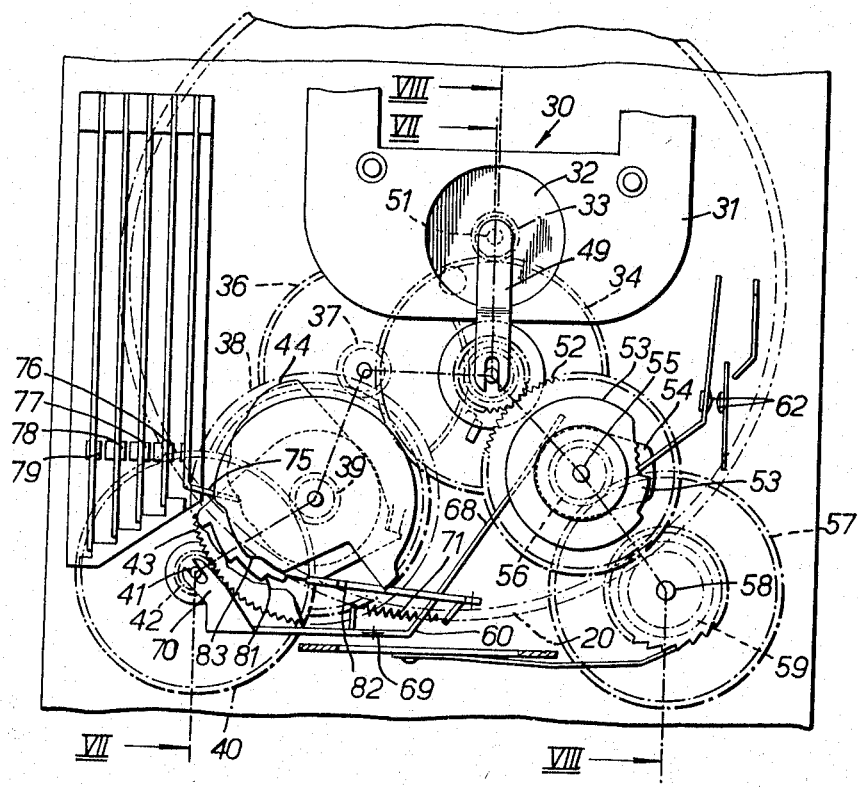
Figure 7:
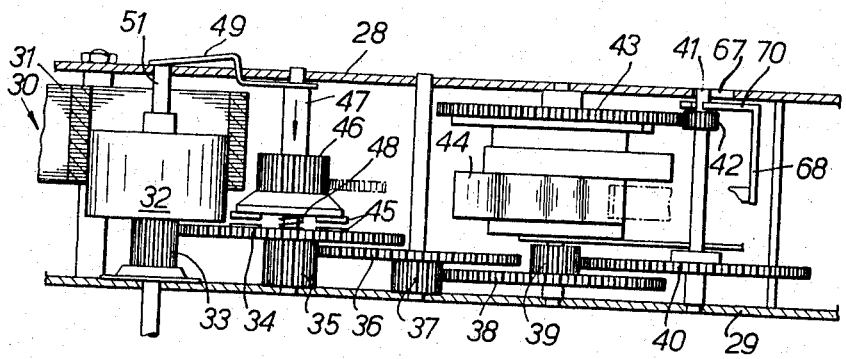
Figure 8:
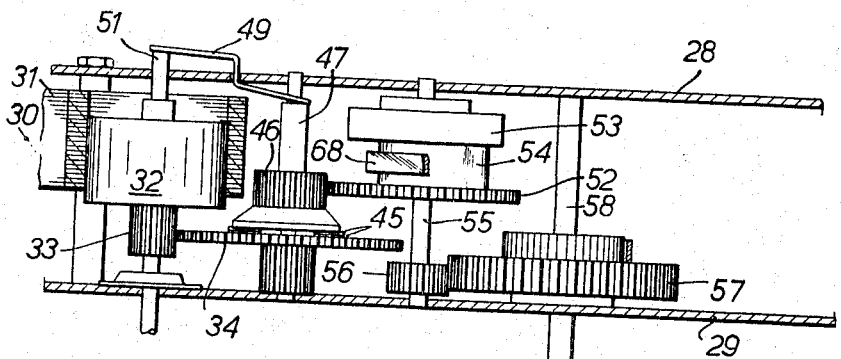
Figure 9:
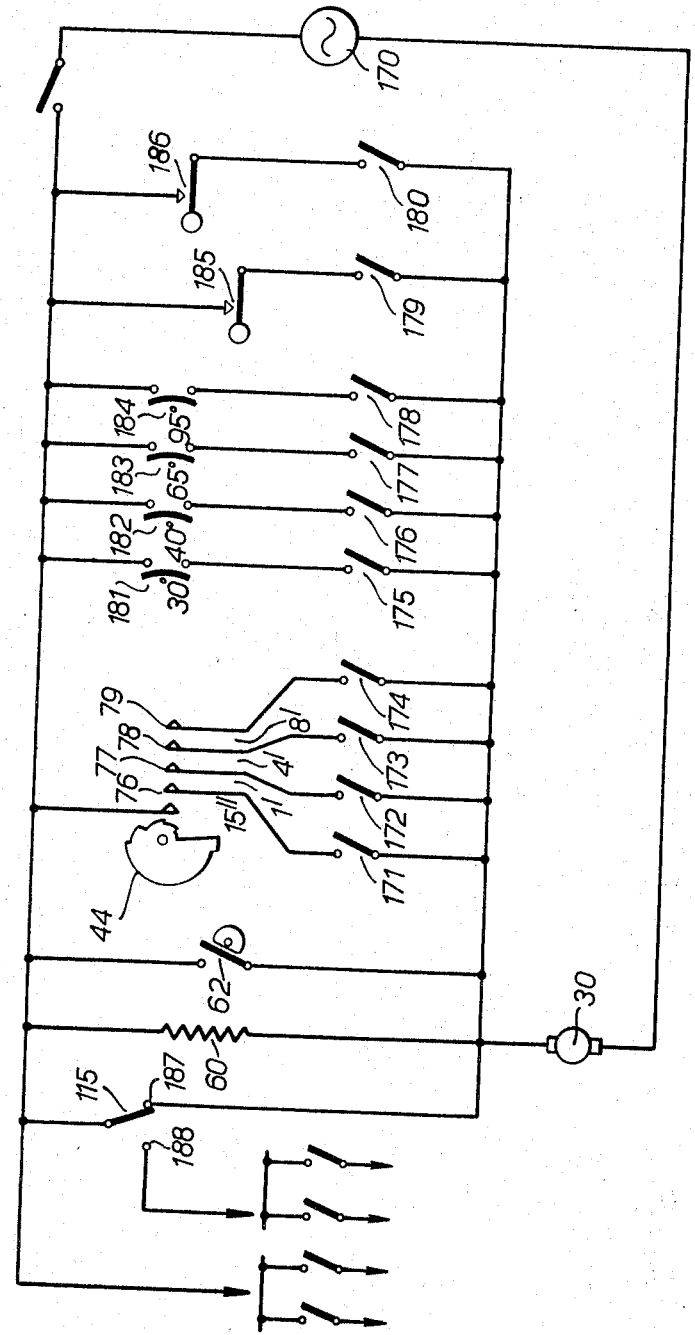

FIGURE 6 is a diagrammatic plan view of the timer with parts broken away to indicate the operation of the timing gear train and the stepping gear train, FIGURE 7 is what may be termed a developed sectional elevation on the folded plane of the line VII—VII of FIGURE 6 and then flattened out, FIGURE 8 is a similar developed section on the line VIII—VIII of FIGURE 6, FIGURE 9 is a circuit diagram, and FIGURES 10A, 10B and 10C are a chart of a set of programs which can be executed with the arrangement.

The invention is illustrated as applied to an automatic washing machine, and as the arrangement may be regarded as a modification of an existing construction the latter will first be described.

In the existing construction an automatic washing machine is provided with a timer or sequence controller for automatically controlling the operations of the machine in accordance with any one of a number of selected programs. The timer incorporates a face cam 20 having on its under side twenty-two concentric operating cam tracks for actuating a corresponding number of pairs of operating contacts (not shown). Most of these are employed to control the various operating components of the machine such as a main driving motor winding for rotating a washing container, a heater, a solenoid controlled cold water filling valve, a solenoid controlled hot water filling valve, an emptying pump, and a spin drying motor winding for rotating the container at high speed for centrifugal drying. Others of the contacts actuated by the operating cam which may be referred to as position contacts, co-operate with timing contacts thermostats and level-responsive controls to control the movement of the timer in a manner described below with reference to FIGURES 9 and 10A, 10B and 10C.

Figure 1:
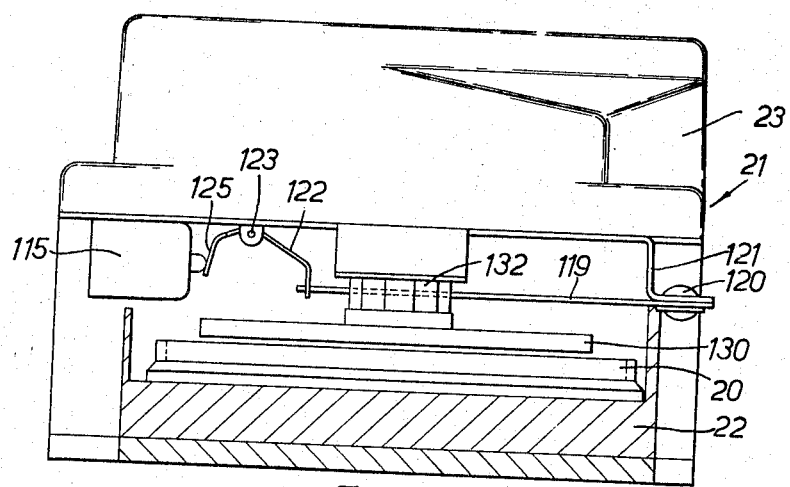
FIGURE 1 is an elevation of a combined timer and preselector.

The device comprises a casing 21 the lower part 22 of which accommodates the operating contacts, while the upper part 23 houses the timing mechanism and the stepping driving means for advancing the operating cams step by step. It will be appreciated that the apparatus may be mounted in any position, but for convenience of description it will be assumed that it is upright in the position indicated in FIGURE 1. The stepping driving means may be of pawl-and-rachet type but is preferably of the form shown in FIGURES 6 to 8 comprising a single shaded pole motor arranged both to drive a timing gear train for measuring time intervals, and also to drive the operating cams through a stepping gear train one step at a time for example through an angular movement of 8$\frac{4}{7}$° to give forty-two steps to a complete revolution.

The construction and operation of the timer will now be briefly described with reference to FIGURES 6 to 8. As indicated above, the timer comprises top and bottom plates 28 and 29 supporting a shaded pole motor 30 having a stator 31 and a rotor 32. As shown in FIGURE 7 the rotor is normally displaced axially downwards from the center of the stator but if the excitation of the stator is sufficient it can be attracted upwards to the position shown in FIGURE 8, and such movement is arranged to engage a clutch in the stepping gear train as described below. The rotor carries a pinion 33 meshing with a gear 34 secured co-axially to a pinion 35.

From FIGURE 7, which shows the timing train developed, it will be seen that the pinion 35 meshes with a gear 36 secured co-axially to a pinion 37 which in turn meshes with a gear 38 secured co-axially to a pinion 39 but loose on its shaft. The pinion 39 meshes with a gear 40 the shaft 41 of which carries a pinion 42 meshing with a timing gear 43 co-axial with a timing cam 44 which actuates a number of timing contacts as described below.

As shown in FIGURE 8 the stepping gear train is driven from the gear 34 through a dog clutch 45 the driving member of which is afforded by the gear 34 while the driven member is afforded by a pinion 46 secured to a sleeve 47 with which it can slide axially on its shaft against the action of a spring 48. A lever 49 passes through a hole in the top plate 28 which provides a fulcrum point. One end of the lever is abutted by the end of the rotor shaft 51 while the other end is forked and bears on the end of the sleeve 47 so that when the rotor is attracted upwards as is shown in FIG-8 the lever 49 is rocked and presses the sleeve 47 downwards to engage the clutch 45 and hence render the stepping train operative. The pinion 46 meshes with a gear 52 carrying a holding cam 53 and release cam 54 while its shaft 55 also carries a pinion 56 meshing with a gear 57 of which the shaft 58 passes through the lower plate 29 and carries a pinion 59 meshing with teeth formed round the edge of the operating face cam 20.

As indicated in FIGURE 9 the motor 30 is connected in series with a resistor 60 and various means are provided for short-circuiting this resistor to cause the rotor to be attracted axially in order to engage the stepping gear train. Among these means are a pair of holding contacts 62 which, as indicated in FIGURE 6, are actuated by the holding cam 53 so as to be closed immediately the stepping gear train starts to move to make a step. Accordingly when the resistor 60 is no longer short circuited by the means that initiated the step, the holding contact 62 will continue to short circuit it until the holding cam 53 has made one complete revolution. The ratios of the gears are chosen in such a manner that this will correspond to an appropriate angular movement of the operating cam 20, for example 8$\frac{4}{7}$°.

The timing cam 44 is acted upon by a spring (not shown) tending to return it to an initial position, and, as shown in FIGURE 7 the shaft 41 of the pinion 42 engages in a slot 67 in the top plate 28 so that it can be rocked out of engagement with the timing gear 43. Such rocking movement is controlled by a lever 68 which as indicated in FIGURE 6 is pivoted at a point 69 and has one end arranged in the path of the release cam 54 while the other end 70 is forked and embraces the shaft 41. A spring 71 tends to keep the lever in its normal position and keep the pinion 42 in engagement with the timing gear 43. Accordingly when the release cam 54 is rotated to effect a step it rocks the lever 69 so as to disengage the pinion 42 from the timing gear 43 and allow the timing gear 43 together with the timing cam 44 to be returned by its spring to its initial position. Hence after a step the timing cam always starts from the same initial position.

The timing cam 44 acts on a cam follower 75 carrying a contact which successively closes timing contacts 76, 77, 78 and 79 after periods of respectively 15 seconds, one minute, 4 minutes and 8 minutes. Thus after a quarter of a minute the first rise on the timing cam 44 will shift the cam follower 75 sufficiently far to close the quarter minute timing contact 76. After a further three quarters of a minute the cam will have moved until a second rise produces a further movement of the cam follower sufficient to close the one minute contacts 77 and so on.

The timing cam 44 may if desired by directly connected to the timing gear 43. It is however found that when timing periods as long as 8 minutes the movement of the gear must be so slow that it is preferable to provide the timing cam with a snap acting movement. To this end the timing cam 44 is connected to the timing gear 43 through a spring (not shown) and is provided with a number of arresting stops 81 which as indicated in FIGURE 6 engage an interconnecting pawl 82. The timing gear 43 is provided with a number of secondary cam rises 83 which also act on the interconnecting pawl as a cam follower. Thus the initial movement of the timing gear 43 is not accompanied by any movement of the timing cam 44 which is held stationary by means of the interconnecting pawl engaging the first of the arresting stops. When the timing gear reaches a position appropriate for the first or quarter minute timing contacts to close, the first of the secondary cam rises shifts the interconnecting pawl from the first of the arresting stops and allows the timing cam to be snapped forward by its spring to close the quarter minute contacts. A similar action occurs at the appropriate time for the closing of each of the remaining pairs of timing contacts.

The operating cams 20 are designed to execute what may be termed a master program including all the operations that will be required in all the programs, and means is provided for omitting unwanted operations in any particular program by causing the stepping driving means to advance the operating cam substantially instantaneously.

For this purpose, in the known arrangement, a manually actuated preselector switch is provided co-operating with one or more contact brushes carried by the operating cams and co-operating with a series of fixed segments corresponding to various positions of the cams and therefore various operations. The pre-selecting switch has contacts connected in circuit with the various segments and with the stepping driving means, so that if a particular pair of pre-selector contacts is closed, then, when the operating cams reach the position where the brush makes contact with the corresponding segment, the stepping driving means will be energized, and the operating cams will immediately be advanced so as to by-pass that operation.

Such an arrangement requires a number of separate segments and a number of separate contacts in the pre-selector.

In the arrangement according to the present invention, as indicated in FIGURES 1 to 4, the pre-selector contacts and the conducting segments and brushes are replaced by a single pair of contacts incorporated in a micro-switch 115.

Figure 2:
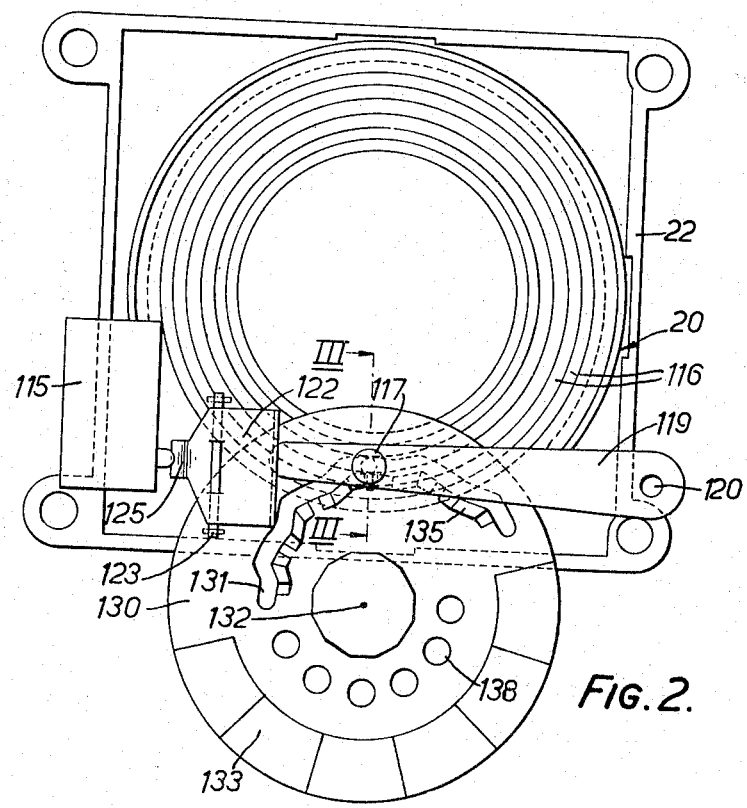
FIGURE 2 is a plan view of the program cams and selector cam and associated parts.

On its upper surface the operating cam 20 is provided with a number of concentric program cam tracks 116, one for each program. These cams co-operate with a primary cam follower constituted by the end 118 of a pin 117 carried by an arm 119 in the form of a spring blade having one end pivoted by means of a rivet 120 to a bracket 121 projecting down from the upper part of the casing so that the blade can turn about a vertical axis. The other end of the arm 119 enters a horizontal slot in one arm of a bell crank 122 which is pivoted at 123 to ears struck down from the upper part of the casing. The second arm 125 of the bell crank engages the micro-switch to actuate it. Thus as shown in FIGURE 2 the second arm 125 of the bell crank is comparatively narrow whereas the first arm is wide enough to allow the arm 119 to actuate it even where it turns about the pivot 120 in a horizontal plane so as to bring the cam follower 117 over any one of the program cam tracks 116.

Figure 3:
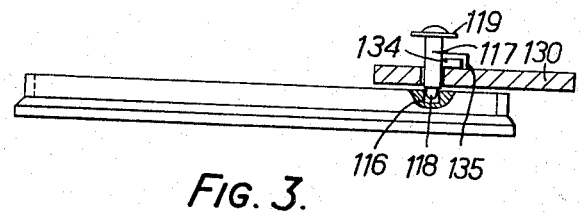
FIGURE 3 is a section of a detail on the line III—III of FIGURE 2.
Figure 4:
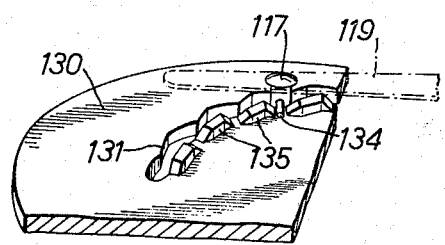
FIGURE 4 is a perspective view of the ramps alongside the selector cam slot.

Such movement is controlled by a selector cam comprising a disc 130 having in it a stepped spiral cam slot 131 through which the cam follower pin 117 extends as shown in FIGURE 3. The selector cam disc 130 is pivoted about its axis 132 and may be provided with figures or other indications 133 indicating its position corresponding to each one of six or more programs. The cam slot 131 has a number of concentric portions, each in the form of an arc struck about the centre, at different distances from the centre, and a number of oblique portions joining the concentric portions. These portions may be curved respectively to arcs and spirals or they may be short straight portions, the concentric portions being at right angles to a radius and the oblique portions being oblique to a radius. A spring device (not shown) is provided to make the selector cam disc tend to snap from one position to another, and the positions are chosen so that in each position the cam follower pin 117 will be approximately in the middle of a concentric portion of the cam slot.

As shown in FIGURE 3 the cam follower pin 117 has a small transverse pin 134 to act as a cam follower co-operating with a number of cam ramps 135 projecting from the face of the selector cam disc 130 along one edge of the cam slot 131. Each of these cam ramps comprises a level top co-extensive with one of the oblique portions of the cam slot and a pair of ends sloping down from the level top to the surface of the cam disc in register with parts of adjacent concentric portions.

Accordingly, when the selector cam disc 130 is moved from one position to the next, the effect will be first that the sloping end portion of an adjacent ramp will lift the transverse pin 134 and hence the cam follower pin 117 and arm 119 so that the pin 117 is clear of the program cam tracks 116 while the cam follower remains within the circumferential portion of the spiral cam slot. Thus the cam follower will be held raised clear of the program cam tracks 116 as the transverse pin 134 rides along the top of the cam ramp and the cam follower is traversed by the spiral portion of the cam slot 131 to move the cam follower from one program cam track 116 to the next. After this has occurred the transverse pin 134 will ride down the inclined end of the cam ramp to lower the cam follower into the next program cam track as it is traversed by the circumferential portion of the cam slot.

The arrangement described provides a simple way of ensuring that the cam follower will be lifted from one program cam track before being shifted across to the next program cam track and then lowered into the latter.

The selector cam disc 130 may be provided with a number of holes 138 co-operating with a pin (not shown) which is controlled by the main switch of the machine, to provide an interlock. This ensures on the one hand that the selector cam disc cannot be moved from one position to another while the main switch is in the "on" position if the cam disc is between two of its predetermined positions.

It will be appreciated that the cam disc can be actuated in various ways, for example it may form a thumb wheel having a portion of its edge projecting through a slot and notched or knurled for ready operation by the thumb of the user. Alternatively it may be provided with a knob, either secured co-axially to it or connected to it through a bevel gear.

In a further arrangement (not shown) the selector cam disc 130 is replaced by a series of rectangular selector plates, one for each program, the selector plate being inserted edgewise into a suitable socket. Each plate has in its face an inclined cam groove with an inner end at a position corresponding to the position of the cam follower 117 for the selected program, and an outer end opening through an edge of the plate. The outer ends of the grooves in all the plates are in the same position, for example a central position, so that as one plate is withdrawn it will leave the cam follower 117 in a position in which it will enter the groove in any other plate. Like the stepped spiral cam slot 131 of the cam disc 130 shown in the drawings each inclined groove may have along its edges ramps to raise the cam follower clear of the program cam tracks 116 before shifting it across from one to another. A number of inclined grooves may be accommodated in a single plate so that a number of different programs may be selected by inserting a single plate in a corresponding number of different orientations.

The combined preselector and timer or sequence controller may be connected in circuit in very many different ways but by ways of example one simple circuit is shown in FIGURE 9 and a possible program is indicated in FIGURES 10A, 10B and 10C. A shown in FIGURE 9 the motor 30 is, as already referred to, connected in series with a resistor 60 to a main supply 170. As already described the resistor 60 is shunted by the holding contacts 62 actuated by the holding cam 53 to ensure that a step, once started, will be completed. It is also shunted by the stepping or over-riding contacts of the micro-switch 115.

As shown in FIGURE 9 a number of the operating contacts actuated by the operating cam 20 co-operate with timing contacts, thermostats and level responsive switches to initiate a step of the operating cam either after a predetermined time or when a predetermined temperature or level is reached. Thus the four timing contacts 76, 77, 78 and 79 are connected respectively in series with operating contacts 171, 172, 173 and 174. Four thermostat switches 181, 182, 183 and 184 closing respectively at 30°, 40°, 65° and 95° C. are connected respectively in series with operating contacts 175, 176, 177 and 178. Finally a pair of level responsive contacts 185 and 186 which close when the level of liquid in the machine rises respectively to a lower level and a higher level are connected respectively in series with operating contacts 179 and 180. Each of these circuits shunts the resistor 60.

FIGURES 10A, 10B and 10C indicate a simple program that can be effected by means of the apparatus having the circuit shown in FIGURE 9. The first column indicates the main divisions of the program, namely prewash, wash and a number of rinses, most of which may conclude with a spin dryer operation. These main divisions are distributed over 42 positions of the main operating cam as shown in the second column. The third column indicates the particular operation that occurs when the cam is in the position indicated. The fourth column, headed impulser, indicates which of the various components shown in FIGURE 9 will initiate a step to put an end to the operation, assuming that it is not bypassed by closing of the over-riding micro-switch 115. Column 5 indicates the manner in which this is achieved by indicating which of the operating contacts 171 to 180 are closed in each position of the cam. Thus for example in interval No. 3 it will be seen that the interval is terminated at the end of one minute, and it will be noted from column 5 that operating contacts 172 are closed during this interval so that when the one minute contacts 77 close the resistor 60 will be short-circuited and a step will be initiated.

Similarly in interval No. 4 a step is to be taken when the low-level-responsive switch 185 closes due to the fact that the liquid has risen to a low level. Accordingly the contact 179 in series with this switch is closed at that time. On the other hand it will be seen that interval No. 5 is terminated when the high level is reached. Accordingly if, in a particular program, it is desired to obtain more vigorous washing by employing a lower level of liquid, all that is necessary is to omit interval No. 5, so that as soon as the liquid level has reached the low point two steps will be produced in succession and the filling will be discontinued. It will be seen below that in certain of the programs the micro-switch 115 is closed at position No. 5 and accordingly in these programs the wash is conducted at low level.

Similar remarks apply to the heating and tumbling intervals 6, 7, 8 and 9. If a wash at a lower temperature is required it is only necessary to omit the intervals which are controlled by higher temperature thermostats.

It is believed unnecessary to describe the remaining intervals which it is thought will be self evident from FIGURES 10A, 10B and 10C.

Column 6 shows the arrangement of the position cam tracks controlling the micro-switch 115 in each of seven positions of the selector cam, that is to say for six programs and return to zero. Referring first to the return to zero it will be seen that the micro switch remains closed throughout all intervals except intervals No. 37. Thus if the selector switch is turned to the return to zero position at any time the sequence controller will step on as far as interval number 37 at which the pump will operate for a period so as to empty the container of any liquid in it at the time. Thereafter the sequence controller will step on to the final off position interval No. 42.

Similarly for the "spin dry" program the micro-switch 115 remains closed so as to omit all the operations up to that of position 37 after which the remaining operations are included, that is to say to pump and remove any water, to continue pumping while tumbling so as to arrange the clothes in the drum, and thereafter to spin for two periods of a quarter of a minute followed by one period of four minutes.

For the remaining operations it is believed unnecessary to comment on the selection of intervals that are omitted. In each case those intervals are included that are required to give the appropriate time, the appropriate temperature and the appropriate level for each operation.

The circuits of the various operating components such as windings of the main driving motor for different speeds, a heater, an emptying pump, solenoid controlled valves and so forth, are omitted from FIGURE 9 for the sake of simplicity since their arrangement is generally well known and requires no explanation. Briefly each component is connected to the supply through appropriate operating contacts so as to be energized at the appropriate positions of the operating cam 20. In some cases the circuit may include additional contacts, for example level-responsive contacts, so that the operation will not start or will be terminated when a certain liquid level prevails, although in many such cases the operation may be terminated by initiating a step when the liquid reaches a given level.

The invention does, however, provide a particularly simple and convenient form of what have been referred to as blocking contacts.

It has previously been proposed to provide such blocking contacts to cut off the current from some or all of the operating components while stepping is occurring. This has generally involved a somewhat complex arrangement but in a construction embodying the invention it can be done particularly simply and conveniently by making the micro-switch 115 a two-way switch having a blocking contact 188 as well as the over-riding contact 187. Thus its contacts can readily be made sufficiently stout to take load currents, and the arrangement involves no complexity whatsoever. A number of the circuits can be arranged to be energized through the blocking contact of the micro switch while others can be energized direct from the supply. Thus for example in the case of the spin dry program it will be appreciated that it would be undesirable for various components to be momentarily energized as the timer is stepped rapidly through the first thirty-six positions of the cam. In fact the micro-switch 115 remains in the over riding position so that all the components fed through the blocking contact 188 remain isolated through this movement. Accordingly when the spin dry program is selected there is an initial pause of perhaps half a minute during which the timer quietly moves forward without energizing any of the components of the washing machine.

It will be appreciated that the invention is not limited to the details of the construction and arrangement described by way of example. In particular it is not necessary to employ a cam follower such as the cam follower 117 carried on a pivoted arm such as the arm 119.

Figure 5:
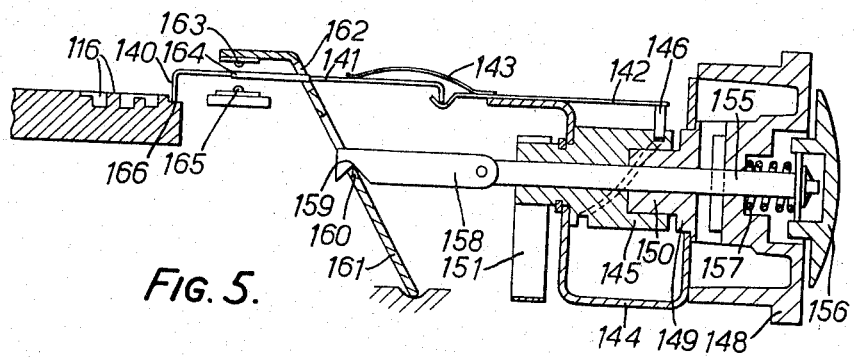
FIGURE 5 is a diagrammatic view of a modified construction.

Thus in the arrangement shown diagrammatically in FIGURE 5 the program cam tracks 116 co-operate with a cam follower 140 afforded by a longitudinally movable strip 141 one end of which is pivoted in a mounting strip 142 and provided with a blade spring 143 tending to hold the cam follower towards the program cam tracks 116. The mounting strip 142 is mounted (by means not shown) to slide on a portion of a frame 114 which also affords a bearing for a helical selector cam 145. This cam has in it a helical groove to receive a cam follower in the form of a pin 146 projecting laterally from the mounting strip 142 so that when the cam is rotated the mounting strip 142 and the cam follower strip 141 will be moved longitudinally. The helical cam groove may be stepped if desired. The helical cam is actuated by a knob 148 having a larger non-circular boss 149 fitting in a corresponding hole in a portion of the frame 144 and a smaller non-circular boss 150 fitting in a corresponding and longer recess in the cam 145. The larger non-circular boss 149 is shaped so as to enter its hole in any one of a number of predetermined positions corresponding to the different programs. The smaller non-circular boss 150 never completely leaves its recess in the helical cam.

Hence in order to move the cam follower from one program cam track to another it is necessary to withdraw the knob 148 (to the right as viewed in FIGURE 5) so that the larger non-circular boss 149 clears its hole, before turning it, and hence with it the cam 145, to the desired position, and then pushing it in again so that the larger noncircular boss enters its hole in another orientation. The cam 145 is provided with a blade spring device 151 tending to snap the cam from one predetermined position to another.

A starter button shaft 155 extends co-axially through the knob 148 and helical selector cam 145. At its outer end the shaft carries a button 156 with a helical compression spring 157 interposed between it and the knob, while at its inner end it carries a pivoted link 158. This link has in its a notch 159 receiving a fulcrum 160 afforded by one end of a slot in an arm 161. The lower end of the arm is pivoted to a fixed pivot while near its upper end it has an opening 162 through which the cam follower strip 141 extends. At its end it carries a fixed overriding contact 163. The cam follower strip 141 carries a moving contact 164 which also co-operates with a fixed blocking contact 165. The position of the opening 162 in the arm 161 is such that when the knob 148 is withdrawn to turn the helical selector cam 145 from one position to another the lower end of the opening 162 will engage the cam follower strip 141 to lift the cam follower 140 clear of the program cams 161. At the same time it will ensure that the fixed contact 163 is withdrawn from the moving contact 164 so that the stepping train cannot be energized.

The program cam is arranged so that each cam track 161 has at the starting position a portion 166 of intermediate depth, such portions being shown in FIGURE 5. When the cam follower 140 rests on such a portion, and the starter button is pressed in, it will rock the arm 161 sufficiently far to bring the stationary contact 163 into engagement with the moving contact 164 so as to produce the first step of the program. Thereafter the cam follower 140 will either be on a low point on the selected program cam track 116, in which case the moving contact 164 is out of reach of the fixed contact 163 even if the starter button should be inadvertently or improperly pressed (and the blocking contact 165 is closed), or on a high point, in which case the stepping train will in any event be energized so that the pressing of the starter button would make no difference.

It will be appreciated that in each of the arrangements described a single pair of contacts serves to actuate the stepping train for each position of each program, instead of requiring a number of separate contacts or portions of a contact for each program. The program cam tracks, even if somewhat complex, involve but little extra expense since the combined operating and program cam can be moulded in a single piece from a suitable plastics material.

Moreover the cam follower is also arranged to actuate the blocking contacts.

The selector cam, or a part moving with it, may also be arranged to actuate additional contacts for selecting components such as thermostats, level responsive switches, and the like which are connected in circuit in certain programs but not in others.

The details of the arrangement and the programs produced may vary widely. For example instead of being as described with reference to FIGURES 9 and 10 the choice of programs may be generally as set forth in the present applicant's British patent specification No. 981,589.

What I claim as my invention and desire to secure by Letters Patent is:

1. In an automatic control means for multi-program automatic machines such as washing machines having a group of operating cams arranged to move as a unit and to actuate electric switches for controlling various operations of the machine, stepping driving means for advancing the operating cams a step when energized, interval terminating means for normally energizing the stepping driving means at the end of each of the operations of the machine, two or more program cams arranged to move as a unit with the operating cams, an overriding switch common to all programs for energizing the stepping driving means independently of the interval terminating means to advance the operating cams to bypass unwanted operations, a carrier having a first cam follower engaging a selected program cam to move the carrier in a first direction to operate said overriding switch, a second cam follower on said carrier, a manually actuated selector cam means having a first cam surface arranged to move said first cam follower in a second direction generally normal to said first direction for moving said first cam follower into operative relation to a selected program cam, and a second cam surface engaging said second cam follower arranged to move said carrier to disengage said first cam follower from said program cams while said carrier is being moved in said second direction into operative relation to a selected program cam and then to return said first cam follower into engagement with said selected program cam.

2. Automatic control means as claimed in claim 1 in which said selector cam means is a rotatably mounted disc, said first cam surface is a stepped spiral slot in said disc engaging said first cam follower and having a series of sections concentric with the disc connected by a series of oblique sections whereby rotation of the disc steps the first cam follower radially of the disc into operative relation with a selected program cam, and said second cam surface comprises a spaced series of oppositely inclined ramps connected by level surfaces projecting from the surface of the disc with the level surfaces registering with the oblique sections of the spiral slot and the ramps registering with the concentric section of the slot whereby the first cam follower is moved into and out of engagement with the program cams in the middle of the concentric sections of said first cam surface.

3. Automatic control means as claimed in claim 1 in which said selector cam means is actuated by a knob, means mounting said knob for rotary and axial motion, means arranged to be operated only by rotary motion of said knob to actuate said first cam surface to move said first cam follower into operative relation to a selected program cam and means arranged to be actuated only by axial motion of said knob to actuate said second cam surface to disengage said first cam follower from the program cams.

4. Automatic control means as claimed in claim 3 including interlocking means blocking rotary motion of said knob except when the knob is positioned axially to move said first cam follower out of engagement with the program cams.

References Cited by the Examiner
UNITED STATES PATENTS

| | | | |
|---|---|---|---|
| 3,033,999 | 5/1962 | Thornbery | 307—141 |
| 3,188,504 | 6/1965 | Anderson | 307—141 |

BERNARD A. GILHEANY, *Primary Examiner.*
G. MAIER, *Assistant Examiner.*